(12) United States Patent
Brooks et al.

(10) Patent No.: US 9,096,397 B2
(45) Date of Patent: Aug. 4, 2015

(54) DOWNWARDLY INSERTABLE VEHICLE RESTRAINTS

(75) Inventors: Andrew Brooks, Thiensville, WI (US); Ben Wieberdink, Cedar Grove, WI (US); Bradley J. Stone, Port Washington, WI (US); Jonathan Andersen, Racine, WI (US); Kurt Lessard, South Milwaukee, WI (US); Norbert Hahn, Franklin, WI (US); Pamala Pietrangelo, Oak Creek, WI (US); Timothy Cotton, Milwaukee, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 923 days.

(21) Appl. No.: 12/751,584

(22) Filed: Mar. 31, 2010

(65) Prior Publication Data
US 2011/0243693 A1    Oct. 6, 2011

(51) Int. Cl.
*B65G 69/00* (2006.01)
*B65G 69/28* (2006.01)

(52) U.S. Cl.
CPC .......... *B65G 69/003* (2013.01); *B65G 69/2811* (2013.01)

(58) Field of Classification Search
CPC .. B65G 69/30; B65G 69/003; B65G 69/2876; B65G 69/2823; B65G 69/2894; B65G 69/005; B65G 69/006; B65G 67/20; B65G 67/00; B65G 67/24; B65G 59/008; B65G 69/001; B65G 69/008; B65G 69/2811; A61G 3/061; B60P 1/43; B60P 1/433; B60P 1/435; B60P 1/431; E01P 15/24; B60T 3/00; B65D 88/121; B61D 7/30; B60S 13/00; H05K 9/0001; E04H 6/10; E04H 14/00; E04H 6/08; E01D 2/00

USPC .......... 414/401, 402, 572, 584, 537; 14/69.5, 14/71.1, 71.3, 71.5; 52/173.1, 173.2, 174, 52/175, 176

See application file for complete search history.

(56) References Cited

U.S. PATENT DOCUMENTS 1,638,477 A * 8/1927 Dyer .............................. 411/470
2,491,870 A * 12/1949 McLaughlin .................. 14/69.5

(Continued)

FOREIGN PATENT DOCUMENTS

| WO | 0024658 | 5/2000 |
| WO | 0043303 | 7/2000 |
| WO | 2005063601 | 7/2005 |

OTHER PUBLICATIONS

International Searching Authority, "International Search Report," issued in connection with international application serial No. PCT/US2011/029944, mailed Jun. 29, 2011, 6 pages.

(Continued)

*Primary Examiner* — Saul Rodriguez
*Assistant Examiner* — Glenn Myers
(74) *Attorney, Agent, or Firm* — Hanley, Flight & Zimmerman, LLC

(57) ABSTRACT

Vehicle restraints are disclosed herein. An example vehicle restraint disclosed herein includes a deck installable at the loading dock and a lip extending from the deck where the deck and lip are movable between a stored configuration and an operative configuration such that the deck and lip in the operative configuration provide a bridge between a vehicle bed and a platform when the deck is installed at a loading dock and the vehicle is at the loading dock. A blocking member is selectively attachable to the lip to selectively engage and disengage a restraint feature of the vehicle bed. The blocking member restricts forward movement of the vehicle relative to the loading dock when the blocking is engaged with the restrain feature and the blocking member allows forward movement of the vehicle relative to the loading dock when the blocking is disengaged from the restraint.

16 Claims, 14 Drawing Sheets

(56) References Cited

U.S. PATENT DOCUMENTS

| | | | |
|---|---|---|---|
| 3,341,037 A * | 9/1967 | Guilbert, Jr. | 414/401 |
| 4,281,728 A * | 8/1981 | Dickason et al. | 177/134 |
| 4,553,895 A | 11/1985 | Ellis | |
| 4,560,315 A | 12/1985 | Hahn | |
| 4,728,242 A | 3/1988 | Erlandsson | |
| 4,853,999 A * | 8/1989 | Smith | 14/69.5 |
| 5,170,976 A * | 12/1992 | Lundman | 248/300 |
| 5,546,623 A * | 8/1996 | Hahn | 14/69.5 |
| 5,645,394 A * | 7/1997 | Hays | 414/537 |
| 5,882,167 A | 3/1999 | Hahn et al. | |
| 5,941,660 A * | 8/1999 | Rueckert | 405/7 |
| 6,113,337 A | 9/2000 | Massey | |
| 6,116,839 A | 9/2000 | Bender et al. | |
| 6,162,005 A | 12/2000 | Fritz | |
| 6,190,109 B1 | 2/2001 | Bender | |
| 6,550,399 B1 * | 4/2003 | Coslovi et al. | 105/458 |
| 6,550,400 B1 * | 4/2003 | Forbes | 105/458 |
| 6,739,279 B2 * | 5/2004 | Funk | 114/362 |
| 7,069,611 B2 * | 7/2006 | Larson | 14/71.3 |
| 7,350,843 B2 * | 4/2008 | Meyers et al. | 296/50 |
| 7,950,094 B2 * | 5/2011 | Bailie et al. | 14/69.5 |
| 7,984,518 B1 * | 7/2011 | Jarvis | 4/496 |
| 8,065,770 B2 * | 11/2011 | Proffitt et al. | 14/69.5 |
| 2003/0204921 A1 * | 11/2003 | Bender et al. | 14/71.3 |
| 2008/0095598 A1 * | 4/2008 | Cotton et al. | 414/401 |
| 2009/0283999 A1 * | 11/2009 | Andersen et al. | 280/762 |
| 2010/0242189 A1 * | 9/2010 | Goin et al. | 14/71.1 |

OTHER PUBLICATIONS

International Searching Authority, "Written Opinion of the International Searching Authority," issued in connection with international application serial No. PCT/US2011/029944, mailed Jun. 29, 2011, 9 pages.

International Bureau, "International Preliminary Report on Patentability," issued in connection with international application serial No. PCT/US2011/029944, mailed Oct. 11, 2012, 10 pages.

* cited by examiner

//<br>
DOWNWARDLY INSERTABLE VEHICLE RESTRAINTS

FIELD OF THE DISCLOSURE

This patent generally pertains to vehicle restraints for use at loading docks and, more specifically, to downwardly insertable vehicle restraints.

BACKGROUND

When a truck, trailer or some other vehicle is parked at a loading dock, often a vehicle restraint is used to keep the truck from inadvertently moving away relative to an elevated platform of the dock. This allows a forklift truck to safely drive between the dock platform and the truck for the purpose of loading or unloading the cargo inside the truck.

There are different vehicle restraints available that can be installed at a loading dock for engaging the truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases, often a wheel chock is used for blocking one or more of the truck's wheels. Although wheel chocks and conventional ICC-style restraints are useful in certain applications, they do have their limitations.

DETAILED DESCRIPTION

Figure 1:
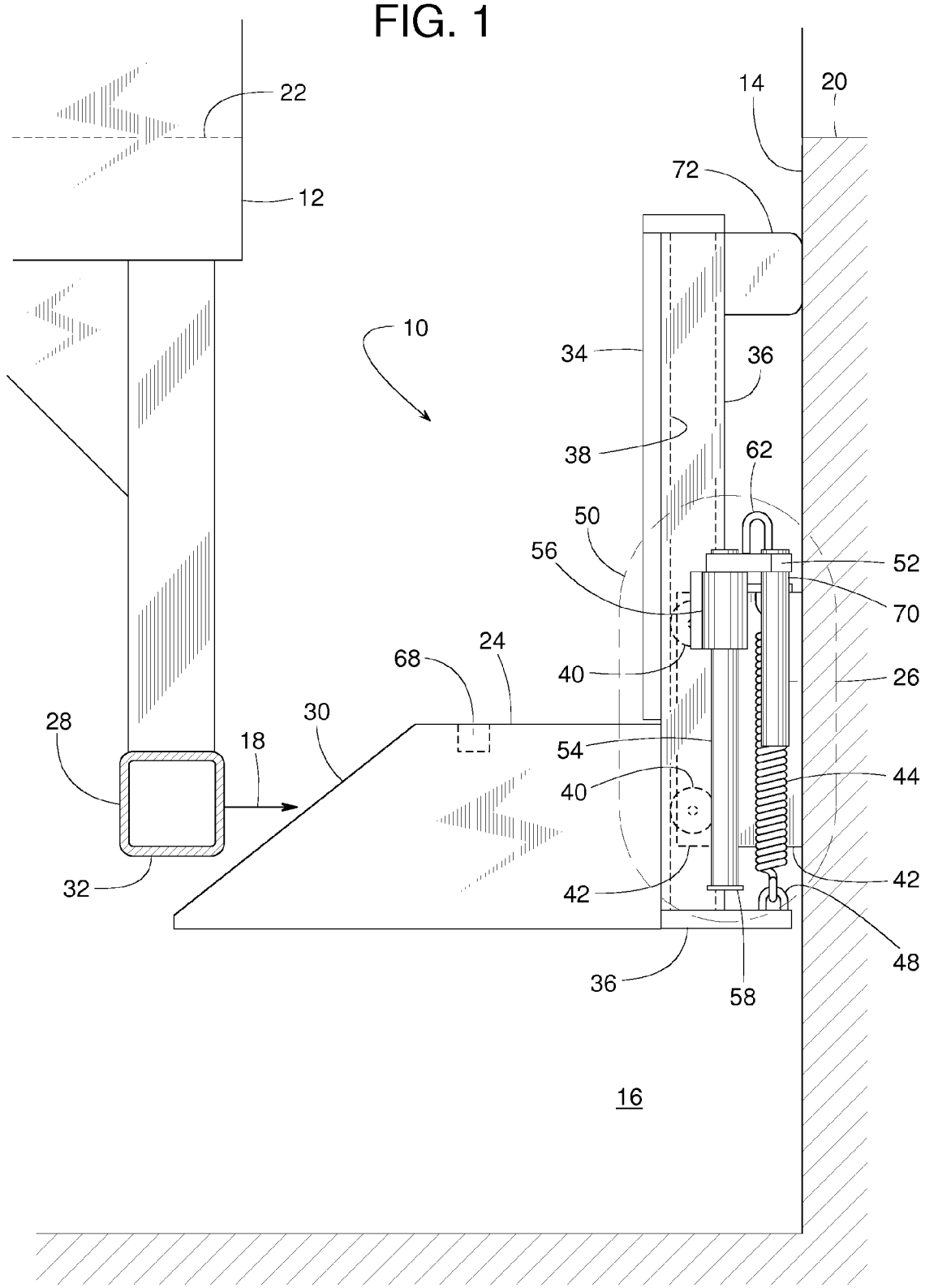
FIG. 1 is a side view of an example wheel restraint disclosed herein having an example blocking member in a release position and an example support member in a stored position.

FIGS. 1-7 show an example vehicle restraint 10 for blocking forward movement of a vehicle 12 (e.g., truck, trailer, etc.) when vehicle 12 is parked at a dock face 14 of a loading dock 16. The expression, "forward movement" refers to a direction pointing generally away from dock face 14, e.g., opposite of arrow 18 of FIG. 1. Restraining vehicle 12 within a certain distance of dock face 14 facilitates safely moving cargo between a platform 20 of dock 16 and a vehicle bed 22 of vehicle 12, particularly when dock 16 includes some type of dock leveler or bridge that spans the gap between platform 20 and vehicle bed 22.

Figure 5:
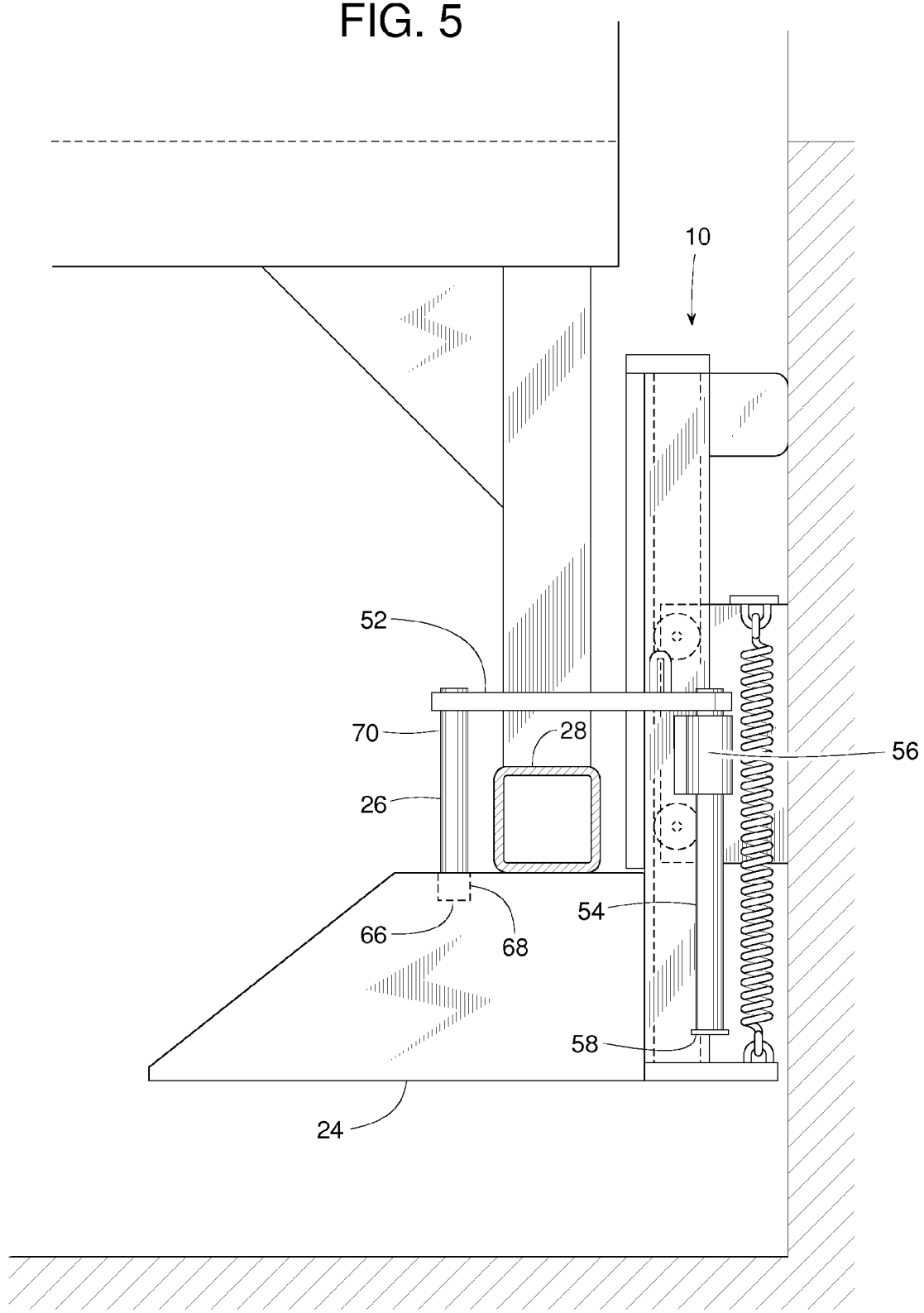
FIG. 5 is a side view similar to FIG. 2 but showing the blocking member in the blocking position.
Figure 6:
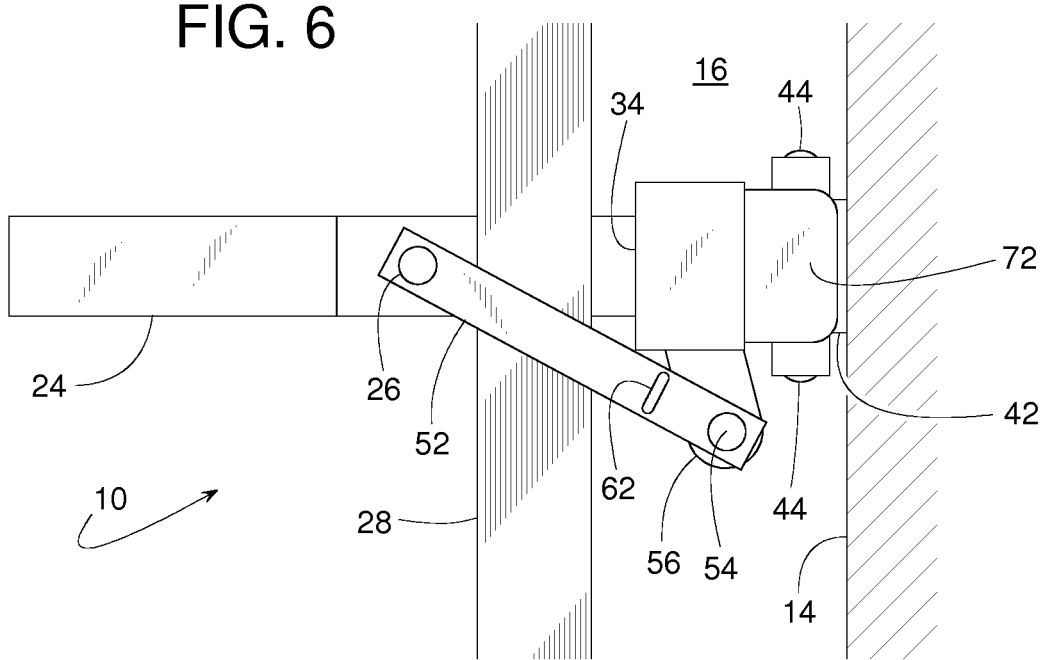
FIG. 6 is a top view of FIG. 5.

In some examples, vehicle restraint 10 comprises a support member 24 and a blocking member 26 that can move to selectively restrain and release vehicle 12. FIGS. 1-3 and 7 show vehicle restraint 10 configured to release vehicle 12, and FIGS. 5 and 6 show vehicle restraint 10 capturing a bar 28 of vehicle 12 to restrain vehicle 12. The term, "bar" refers to any suitable structure of vehicle 12 that can be restrained by various examples of vehicle restraint 10. An example of bar 12 includes, but is not limited to, a Rear Impact Guard of a vehicle, which is sometimes called an ICC bar, wherein "ICC" stands for Interstate Commerce Commission.

Figure 2:
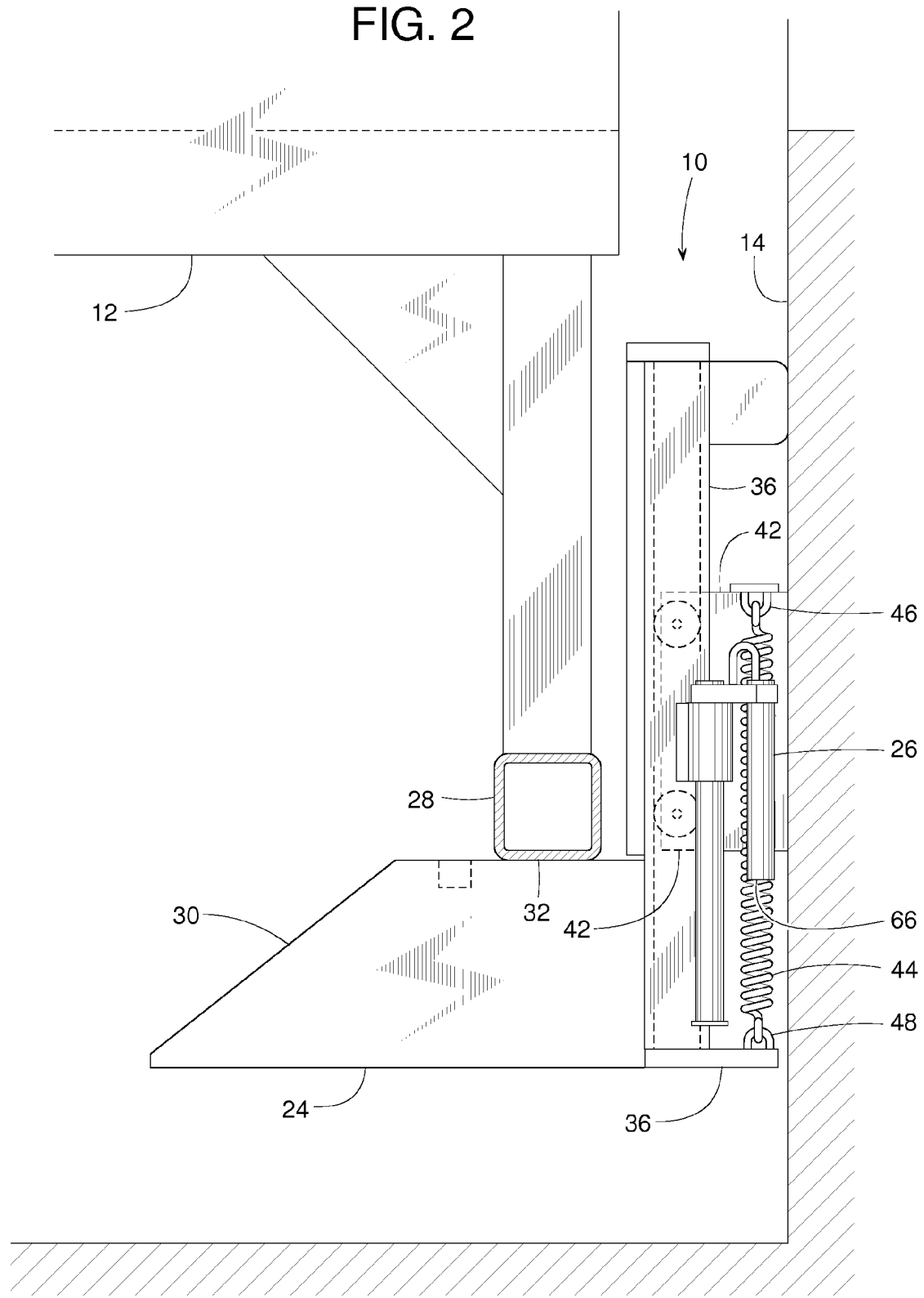
FIG. 2 is a side view similar to FIG. 1 but showing the support member in an operative position.
Figure 3:
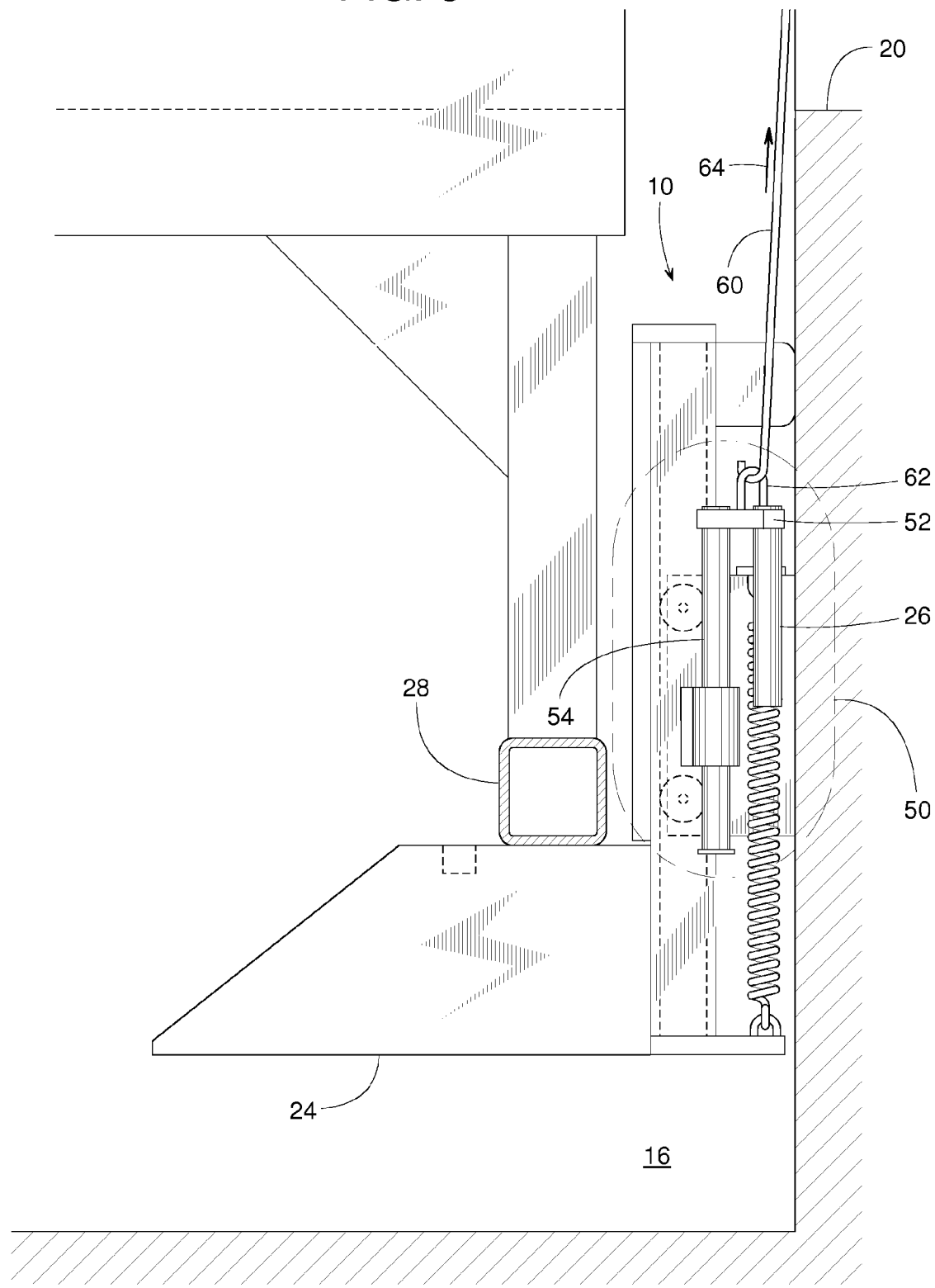
FIG. 3 is a side view similar to FIG. 2 but showing the blocking member at an intermediate position.
Figure 4:
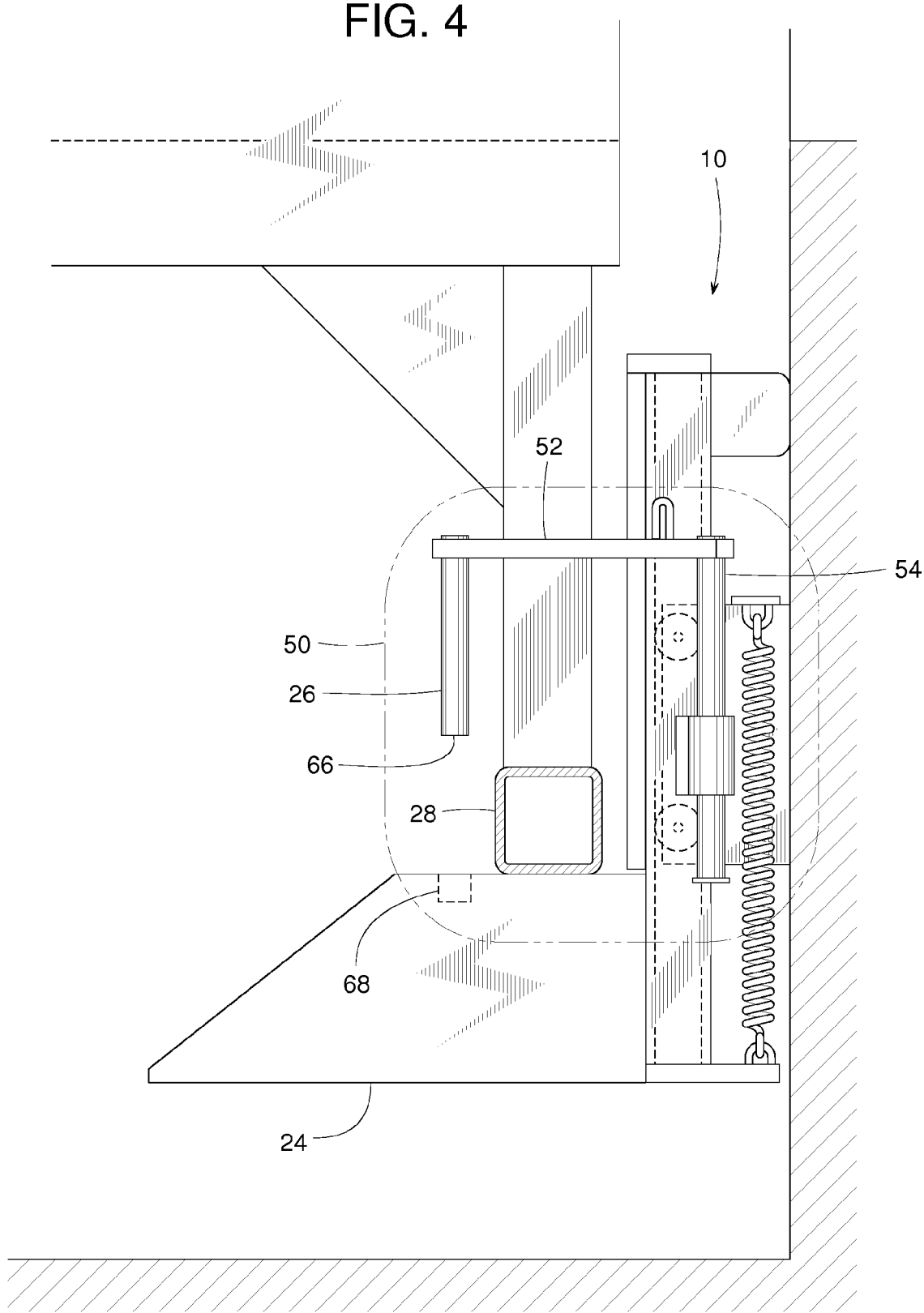
FIG. 4 is a side view similar to FIG. 2 but showing the blocking member at another intermediate position.

For the illustrated example of FIGS. 1-7, to selectively release or restrain vehicle 12, support member 24 moves between a raised, inoperative (stored) position (FIG. 1) and at least one operative position (e.g., FIGS. 2-7). Likewise, blocking member 26 moves between at least one release position (FIGS. 1-3 and 7) and a blocking position (FIGS. 5 and 6). FIG. 4 shows blocking member 26 at an intermediate position between the release position and blocking position(s). In some examples, members 24 and 26 move independently of each other, and in other examples, a mechanism, linkage, and/or a controller forces members 24 and 26 to move in some coordinated interdependent manner. One example sequence of operation is as follows.

In this example, operation begins as shown in FIG. 1, wherein vehicle 12 is shown backing toward dock face 14 while support member 24 is elevated or raised in the stored position, and blocking member 26 is at the release position.

As vehicle 12 travels from its position of FIG. 1 to that of FIG. 2, bar 28 engages and slides along an inclined cam surface 30 of the support member 24, whereby bar 28 pushes or moves support member 24 downward from the raised, inoperative (stored) position (FIG. 1) to a lowered, operative position (FIG. 2) where support member 24 engages a downward facing surface 32 of bar 28.

To prevent or minimize damage from impact between vehicle 12 and dock face 14 and to protect vehicle restraint 10 from the impact of bar 28 or some other part of vehicle 12, the vehicle restraint 10 includes a bumper 34 (e.g., a plate or block of metal, a rubber, a plastic, or some other protective material). Bumper 34 may preferably be a "resilient shock-absorbing bumper," which may refer to a structure that can absorb at least some impact energy and later return substantially to its pre-impact condition. Examples of a resilient shock-absorbing bumper include, but are not limited to, a polymeric block (e.g., rubber or polyurethane), a metal plate backed one or more springs, a metal plate backed by a polymeric block, a polymeric plate backed by a metal block, and/or various combinations thereof.

Although the bumper in the illustrated examples engages the Rear Impact Guard, or ICC bar, it is generally desirable for the bumper to engage the rear-most portion of a vehicle. The rear-most portion of the vehicle is often the Rear Impact Guard, or ICC bar, but in some instances it may be the rear sill of the trailer bed. In such instances, it may be desirable for the bumper 34 to be larger or positioned such that the bumper 34 engages the rear sill of the trailer bed, instead of the Rear Impact Guard, or ICC bar when the vehicle is in the loading dock. In either case, the bumper 34 engages a rear portion of the vehicle 12 to prevent or minimize damage from impact between a vehicle 12 and dock face 14 and to protect vehicle restraint 10 from the impact of bar 28.

In the illustrated example, support member 24 is moveable in a substantially vertical direction because it is attached to a movable frame 36. Frame 36, in this example, includes a substantially vertically movable track 38 guided by a set of rollers 40 (or alternate guide members) that are attached to a stationary base 42. Base 42, in this example, is anchored to dock face 14 such that horizontal forces exerted against the vehicle restraint 10 by vehicle 12 are resisted by the strong, solid structure of dock face 14. In this example, a spring 44 held in tension between one point 46 (FIG. 2) on base 42 and a second point 48 on frame 36 urges frame 36 and support member 24 upward. Thus, spring 44 biases support member 24 toward its raised, inoperative (stored) position of FIG. 1 when a vehicle is not in the loading dock 16 or moves support member 24 up into engagement with bar 32 when a vehicle is in the loading dock 16.

In other examples, base 42 comprises a stationary vertical track affixed to dock face 14, and frame 36 includes rollers that travel along the track, whereby frame 36 becomes a vertically movable track follower with support member 24 attached thereto.

Regardless of how the vertical movement of support member 24 is achieved, after bar 28 is in the position shown in FIG. 2, vehicle 12 is restrained by moving blocking member 26 from the release position (FIGS. 1 and 7) to the blocking position (FIGS. 5 and 6). Blocking member 26, in this example, is part of a blocking structure 50 comprising a connector 52 that connects blocking member 26 to an attachment end 54, wherein attachment end 54 is supported by a sleeve 56 that is attached to frame 36. Sleeve 56 and frame 36 move together as a unit, and attachment end 54 can slide vertically within sleeve 56. Attachment end 54 can also rotate about a vertical axis relative to sleeve 56. An end cap 58 and connector 52 limit the vertical travel distance of attachment end 54 relative to sleeve 56.

In the illustrated example, blocking member 26 is moved from the release position to the blocking position by first lifting blocking member 26 up from the position of FIG. 2 to the position of FIG. 3. In some examples, the lifting of blocking member 26 is done manually, e.g., by using a hand tool 60 (FIG. 3) that can reach down and hook onto a lift ring 62 on connector 52 so that a dockworker on platform 20 of dock 16 can manually manipulate blocking structure 50, as indicated by an arrow 64.

In the example where blocking member 26 is moved manually, after reaching the intermediate position shown in FIG. 3, blocking structure 50 is rotated relative to sleeve 56 to the position shown in FIG. 4 and then lowered to the position shown in FIGS. 5 and 6. Once blocking structure 50 is manipulated to place blocking member 26 at the blocking position of FIGS. 5 and 6, connector 52 extends out over bar 28, and a lower end 66 of blocking member 26 engages support member 24 by fitting into a receptacle 68 (e.g., a round hole, a rectangular opening, a channel, a crevice, etc.) in support member 24. In the example blocking position, an upper end 70 (FIG. 5) of blocking member 26 is horizontally supported by connector 52 via attachment end 54 and sleeve 56, and lower end 66 of blocking member 26 is horizontally supported by the receptacle's sidewalls 72 (FIG. 7) of support member 24. Such horizontal support at both ends of blocking member 26 provides strong resistance to vehicle 12 inadvertently attempting to pull bar 28 forward out from within the confines of vehicle restraint 10. Although blocking member 26 engaging receptacle 68 may provide significant resistance to vehicle pull-out, blocking member 26 may also be effective without receptacle 68.

Figure 7:
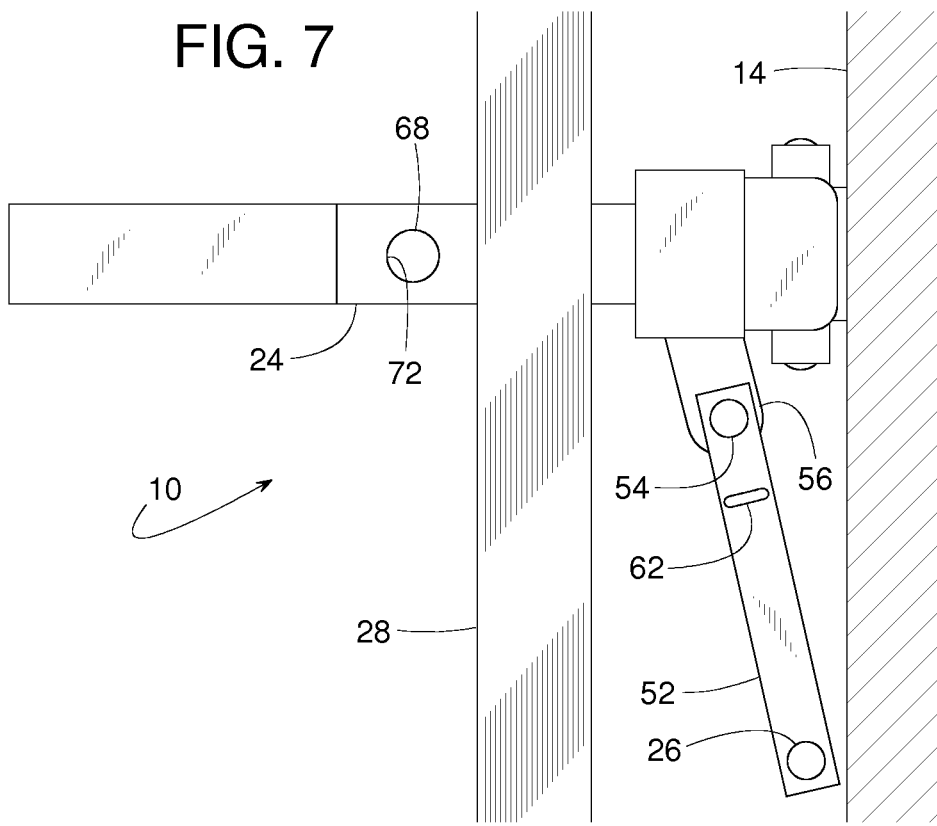
FIG. 7 is a top view of FIG. 2.

To release bar 28, blocking structure 50 is moved sequentially from the position of FIGS. 5 and 6, through the position of FIG. 4, through the position of FIG. 3 (and FIG. 7), and then to the position of FIG. 2 (and FIG. 7). This allows vehicle 12 to drive away from dock face 14, thereby moving bar 28 from the position of FIG. 2 to that of FIG. 1. Removing bar 28 from atop support member 24 allows spring 44 to lift support member 24 from a lowered, operative position of FIG. 2 to the raised, inoperative (stored) position of FIG. 1.

In some examples, blocking structure 50 includes a back support 72 attached to an upper end of frame 36. In the event that vehicle 12 backs against bumper 34 of frame 36, back support 72 bolsters the upper end of frame 36 by transmitting the vehicle's force of impact from frame 36 to the more solid dock face 14.

In other examples, shown in FIGS. 8-13, a vehicle restraint 74 and 74' comprises a combination resilient shock-absorbing bumper 76 and a blocking structure 78 or 78'. Bumper 76 attaches to dock face 14 at a position to prevent or minimize damage from impact between a vehicle 12' and dock face 14. The expression, "resilient shock-absorbing bumper" as used herein means a structure that can absorb at least some impact energy and later return substantially to its pre-impact condition. Examples of a resilient shock-absorbing bumper include, but are not limited to, a polymeric block (e.g., rubber or polyurethane), a metal plate backed one or more springs, a metal plate backed by a polymeric block, a polymeric plate backed by a metal block, and/or various combinations thereof. In the examples illustrated in FIGS. 8-13, bumper 76 comprises a polymeric plate 80 (e.g., neoprene, rubber, polyurethane, etc.) attached to a metal block 82 (e.g., steel).

Figure 9:
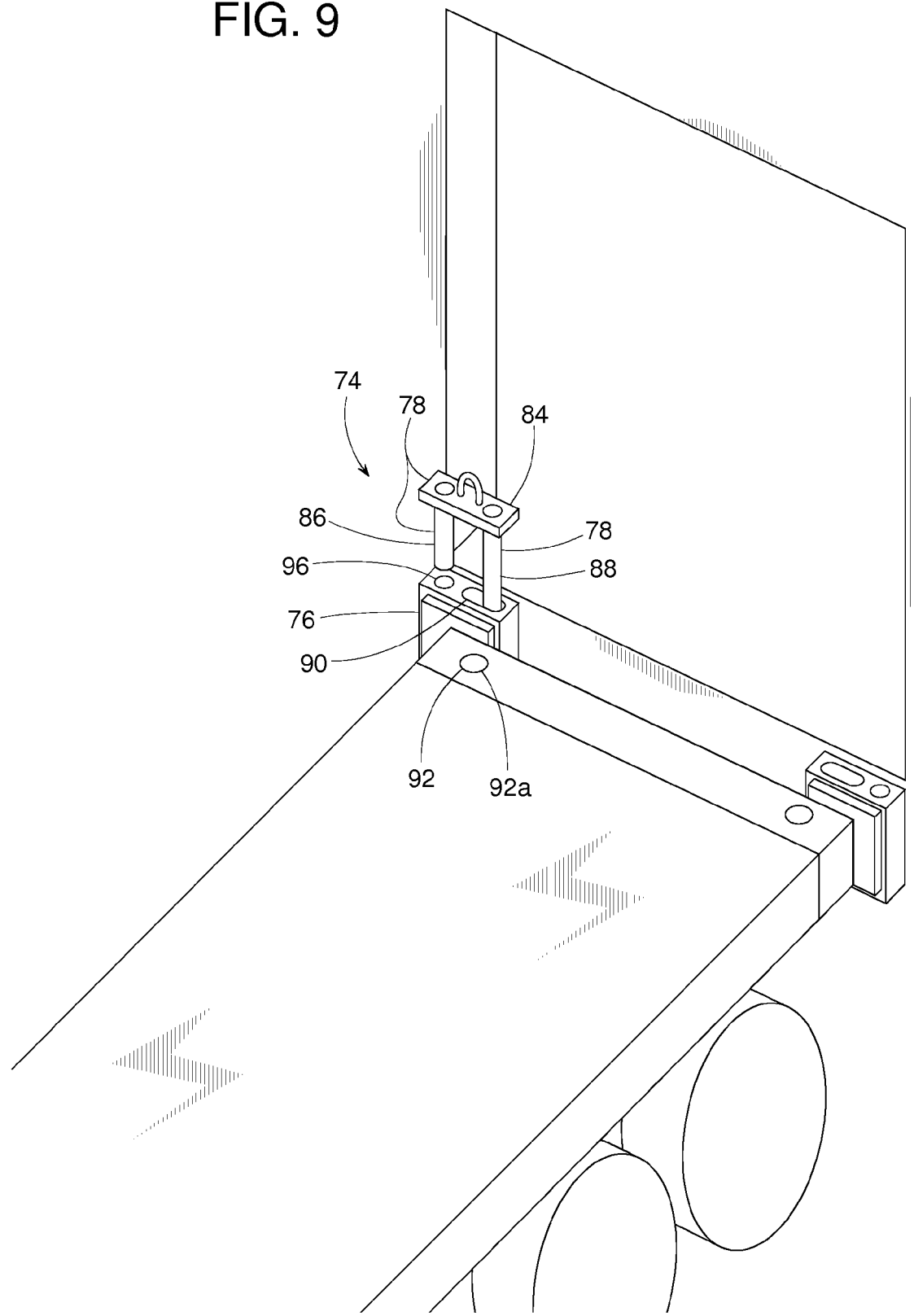
FIG. 9 is a perspective view similar to FIG. 8 but showing the blocking member at an intermediate position.
Figure 10:
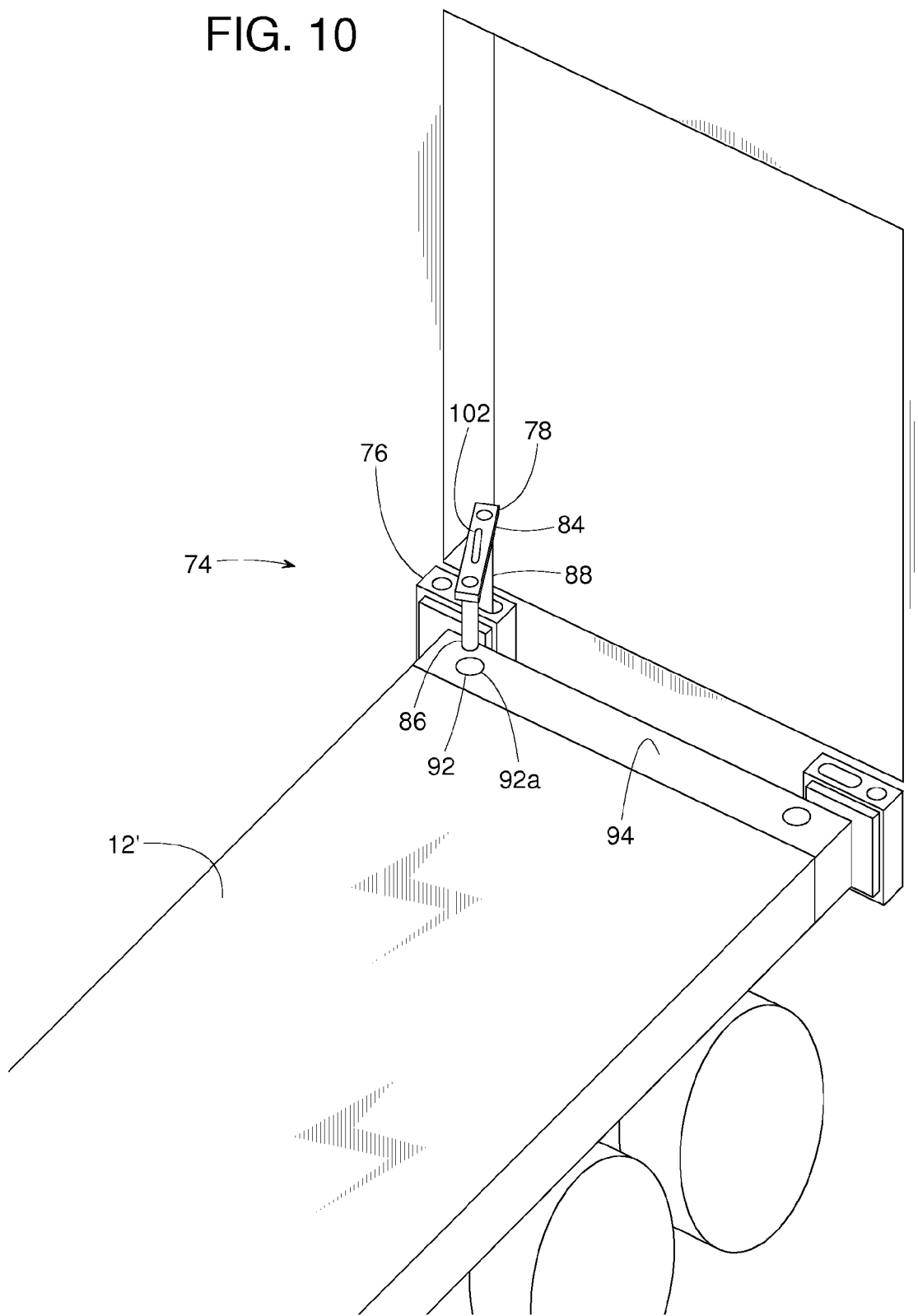
FIG. 10 is a perspective view similar to FIG. 8 but showing the blocking member at another intermediate position.
Figure 11:
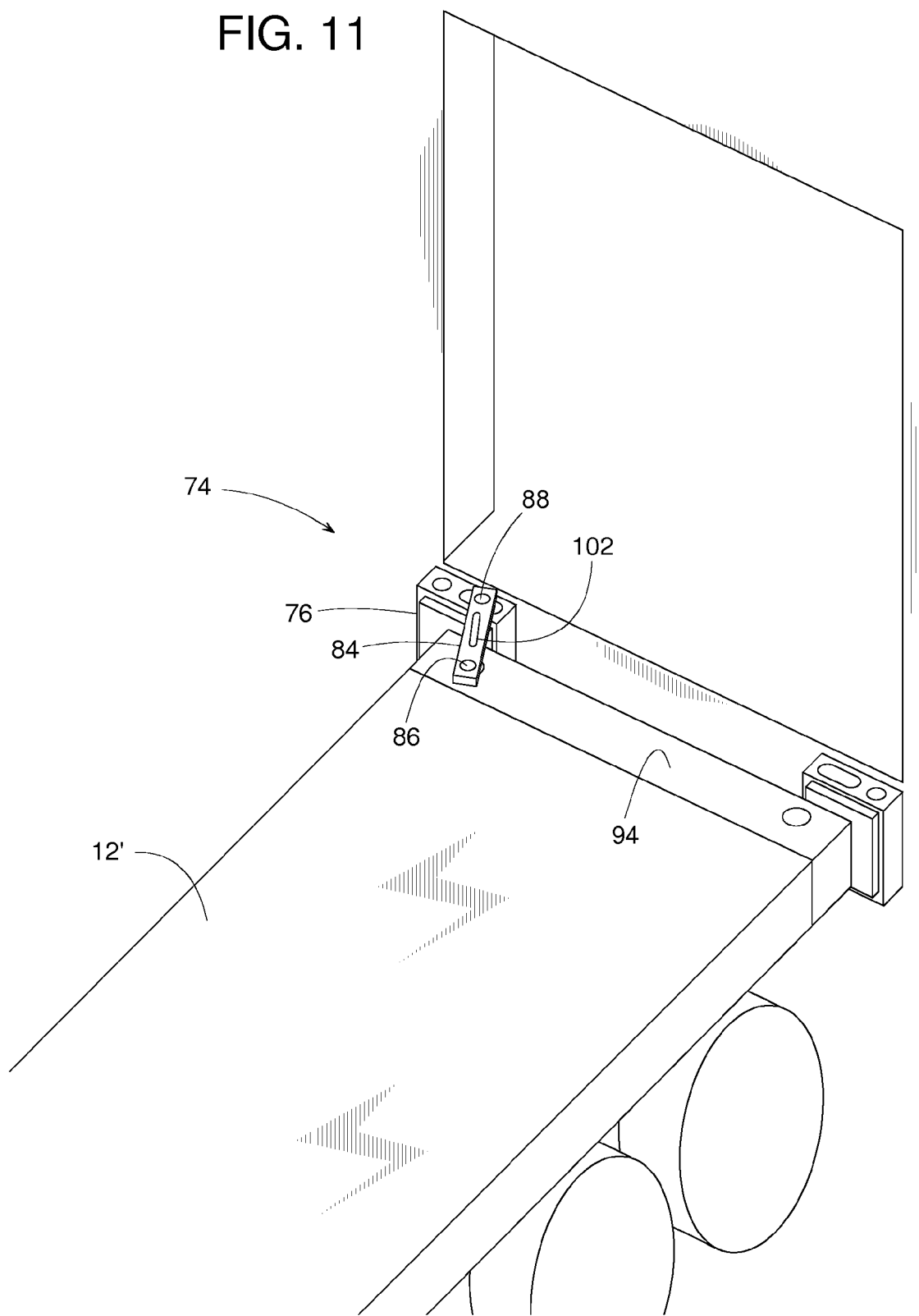
FIG. 11 is a perspective view similar to FIG. 8 but showing the blocking member in a blocking position.

In the example of FIGS. 8-12, blocking structure 78 comprises a connector 84 connecting a blocking member 86 to an attachment end 88, wherein attachment end 88 is disposed within a first opening 90 in bumper 76. In this example, blocking structure 78 can be manually manipulated to selectively move blocking member 86 between a release position (FIG. 8) and a blocking position (FIG. 11). In the blocking position of FIG. 11, forward movement of vehicle 12' is restrained or limited by blocking member 86 engaging a restraint feature 92 of vehicle 12' while attachment end 88 is attached to bumper 76. In the illustrated example, restraint feature 92 is a hole 92a in a frame 94 of vehicle 12'. Restraint feature 92 could also comprise a tube, a cup, a Rear Impact Guard, or other structure attached to a rear portion of vehicle 12' and adapted to be engaged by blocking member 86. For purposes of this example, any such structure shall be considered to be part of the vehicle. In the release position of FIG. 8, connector 84 rests upon bumper 76 with attachment end 88 in first opening 90 and blocking member 86 stored in a second opening 96 in bumper 76.

Figure 13:
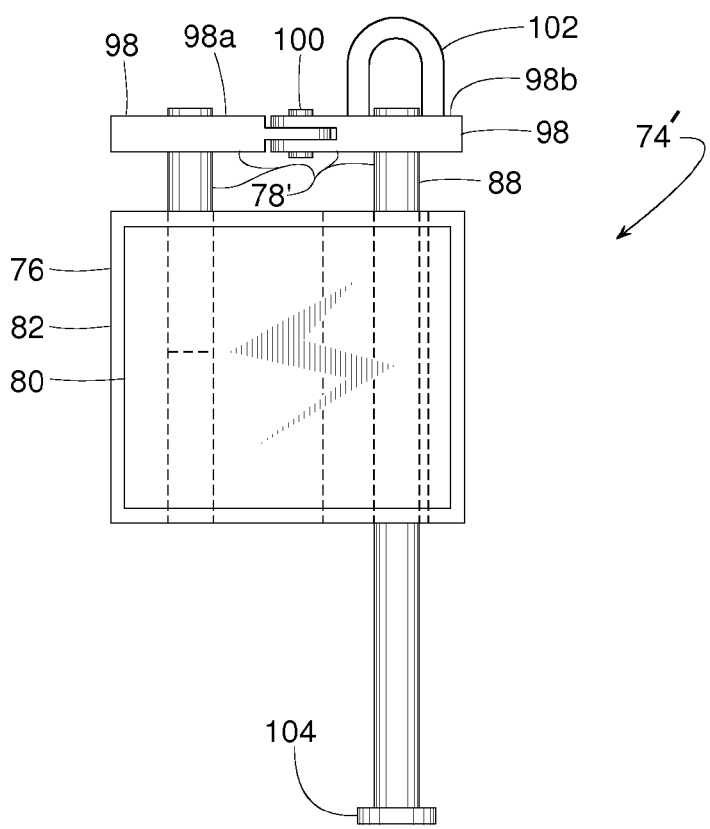
FIG. 13 is a front view of another example vehicle restraint.

As shown, first hole 90 is a slot to allow some adjustment in the alignment between hole 90 in bumper 76 and hole 92a in vehicle 12'. Referring to FIG. 13, to accommodate further misalignment between holes 90 and 92a, in some examples, connector 84 is an articulated arm 98, wherein a pivot pin 100 provides a hinged connection between arm segments 98a and 98b. In some examples, holes 70 and 96 in bumper 76 open into each other to create one continuous slot in bumper 76. In some examples, instead of storing blocking member 86 in hole 96, blocking member 86 stores alongside bumper 76 and hole 96 is omitted.

Figure 8:
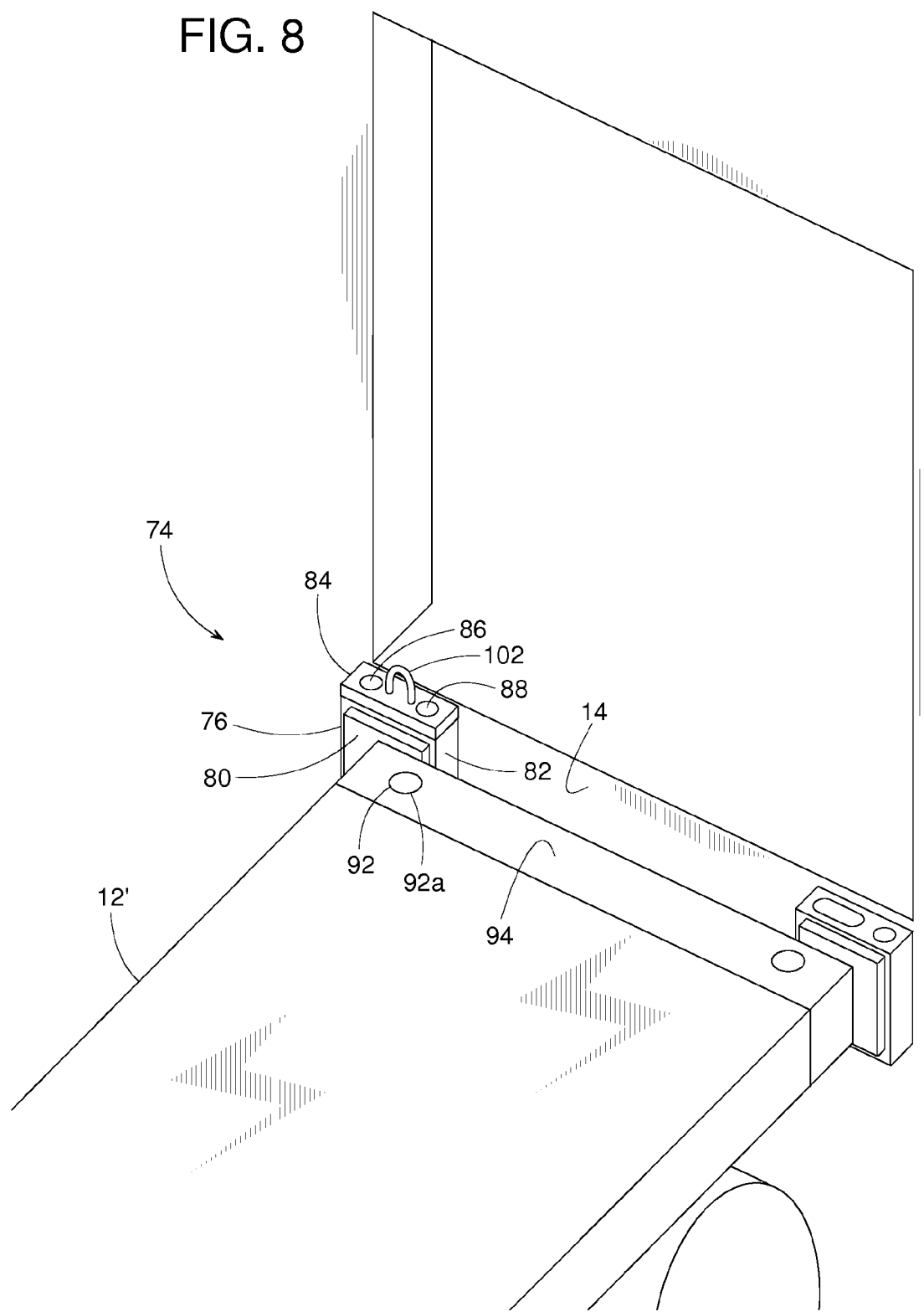
FIG. 8 is a perspective view of another example vehicle restraint disclosed herein having a blocking member in a release position.

For the illustrated example, operation of vehicle restraint 74 can follow the sequence of FIGS. 8-11. In FIG. 8, vehicle 12' is shown backed up against bumper 76 with blocking structure 78 (FIG. 12) in its stored position. FIG. 9 shows blocking structure 78 having been raised, manually or otherwise, to remove or disengage blocking member 86 out from within hole 96 while attachment end 88 still extends into hole 90. FIG. 10 shows blocking structure 78 having been rotated, manually or otherwise, to position blocking member 86 directly over hole 92a in vehicle 12'. FIG. 11 shows blocking member 86 having been lowered into hole 92a to restrain vehicle 12'.

Releasing vehicle 12' can be accomplished by following a reverse sequence, i.e., FIG. 11, FIG. 10, FIG. 9, and then FIG. 8. To assist in manually manipulating vehicle restraint 74 between the blocking and release positions, a hand tool (e.g., tool 60 of FIG. 3) can be used to hook onto a lift ring 102 on connector 84.

Figure 12:
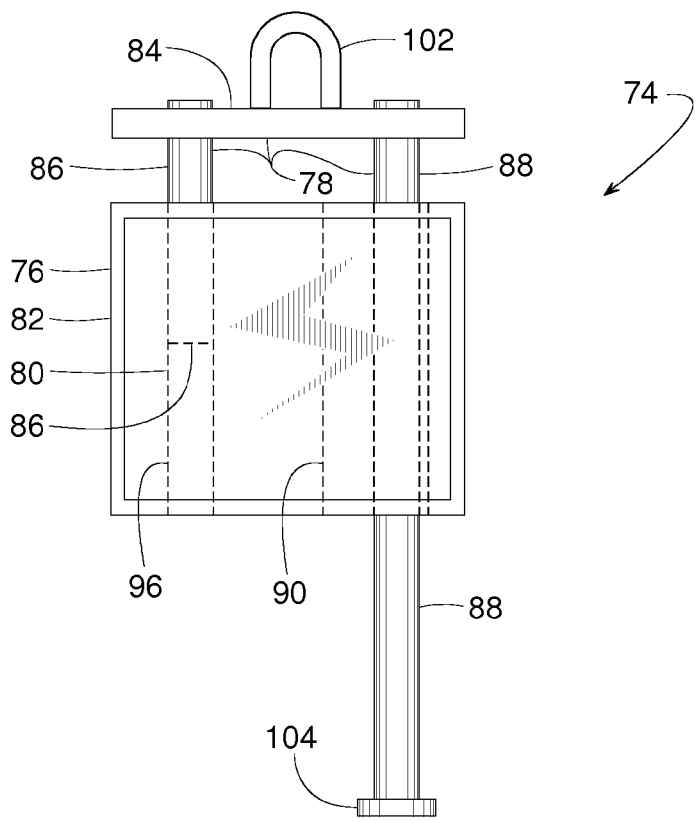
FIG. 12 is a front view of the vehicle restraint shown in FIG. 8.

To help keep blocking structure 78 attached to bumper 76, some example vehicle restraints provide attachment end 88 with an end cap 104, as shown in FIGS. 12 and 13.

In other examples, shown in FIGS. 14-18, a vehicle restraint 106 includes an example blocking member 108 that temporarily secures a vehicle 12" or its vehicle bed 110 to an example lip 112 of an example dock leveler 114, wherein dock leveler 114 is selectively movable between a stored configuration (FIG. 14) and an operative configuration (FIGS. 15-18). In the illustrated example, dock leveler 114 comprises a deck 116 with a front edge 118 that is vertically adjustable to roughly match the height of the vehicle's rear edge 120. In the operative configuration, lip 112 extends between the deck's front edge 118 and the vehicle's bed 110 to bridge the gap between the vehicle 12 and the platform 20 so that cargo can be transferred between vehicle bed 110 and platform 20 of loading dock 16.

Depending on the specific example of dock leveler, the adjustment of the deck's front edge 118 can be by various means including, but not limited to, deck 116 pivoting about a rear hinged edge 122 (as illustrated) or by vertical translation of a deck. Also depending on the specific example of dock leveler, lip 112 can be movable by various means including, but not limited to, lip 112 pivoting about a hinge 124 that couples lip 112 to deck 116 (as shown) or by relative translation between a deck and a lip.

Figure 14:
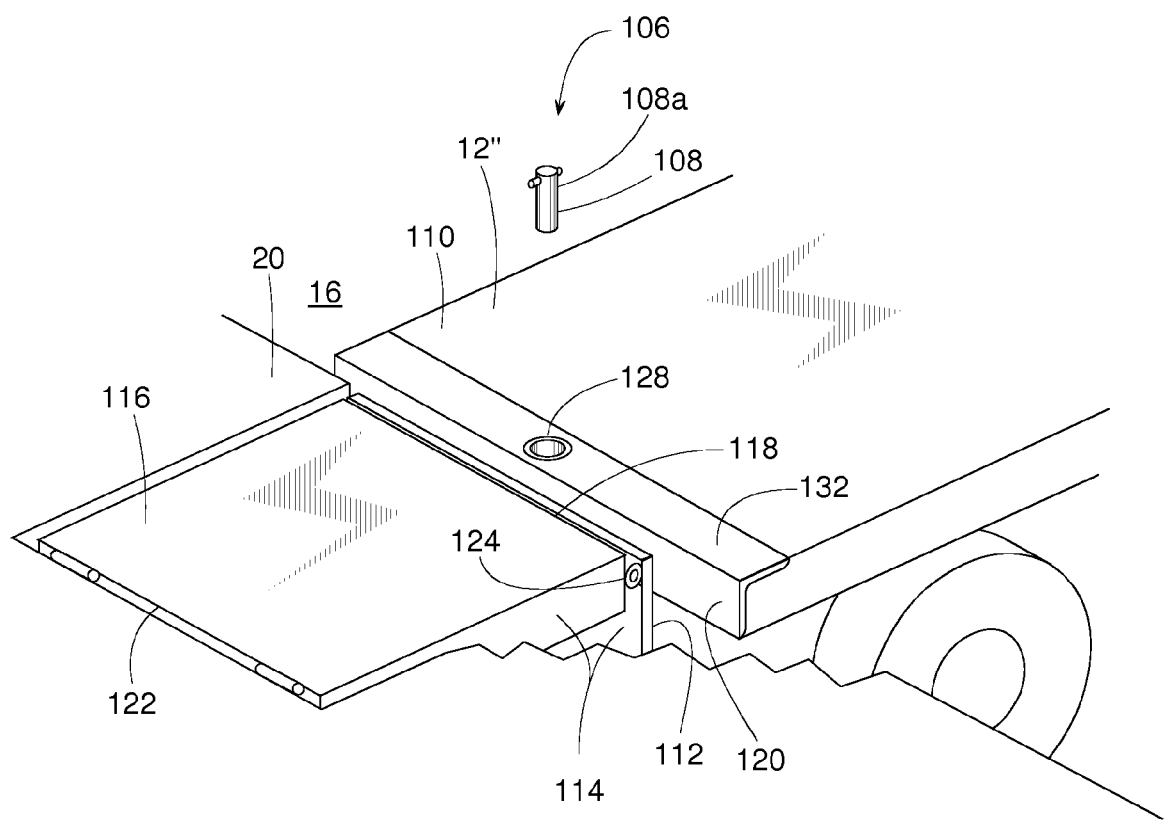
FIG. 14 is a perspective view of a vehicle at a loading dock with a dock leveler in a stored configuration.

An example operation of vehicle restraint 106 can begin with vehicle 12" backed into dock 16 with dock leveler 114 in the stored configuration, as shown in FIG. 14.

Figure 15:
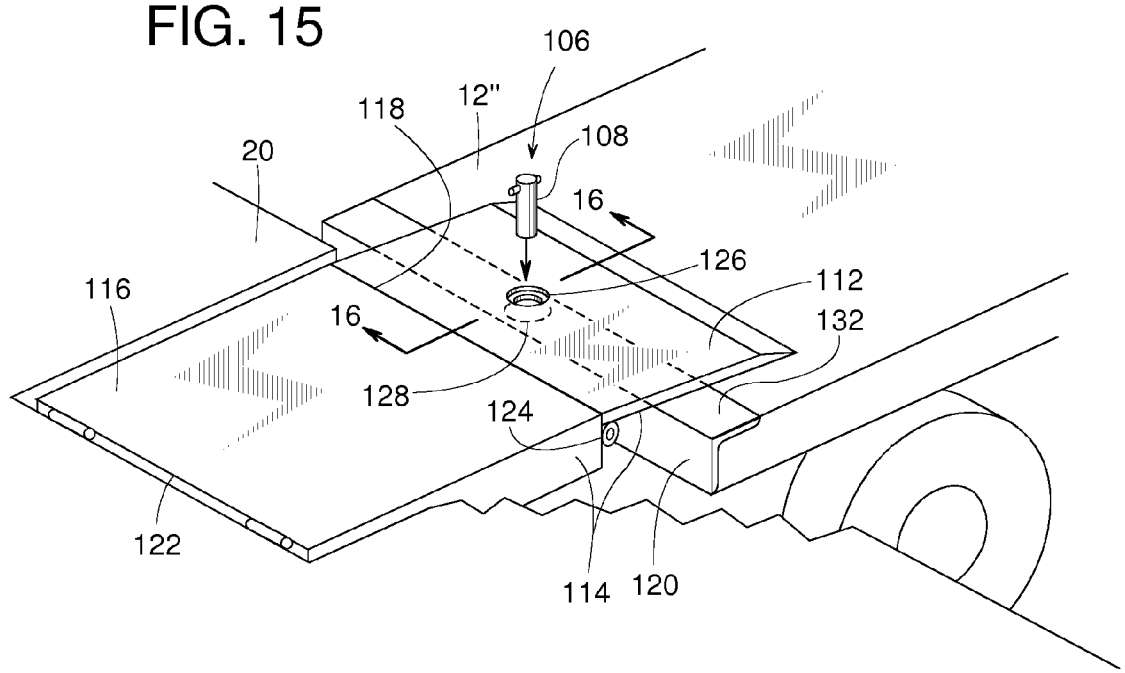
FIG. 15 is a perspective view similar to FIG. 14 but showing the dock leveler in an operative configuration and an example blocking member disclosed herein in a release position.
Figure 16:
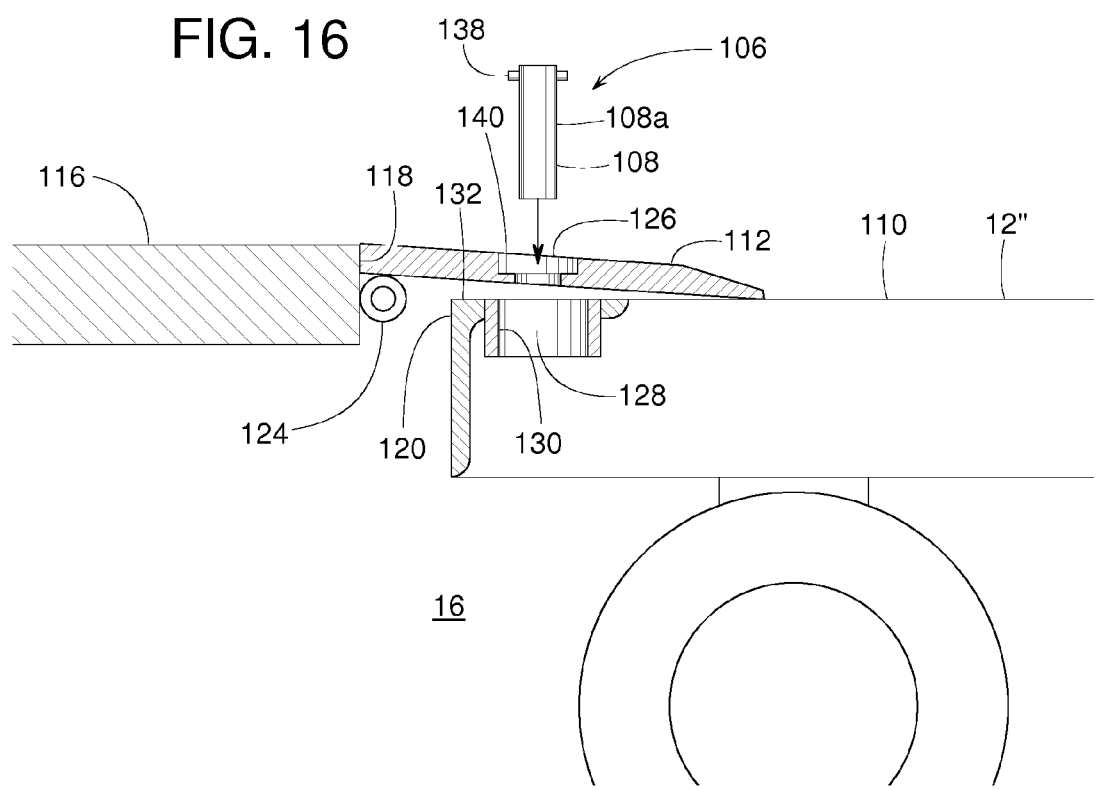
FIG. 16 is a cross-sectional view taken along line 16-16 of FIG. 15.

Next, front edge 118 of deck 116 initially rises to allow lip 112 to reach out over the vehicle's rear edge 120, and then deck 116 descends to lower lip 112 onto vehicle bed 110, as shown in FIGS. 15 and 16.

Figure 17:
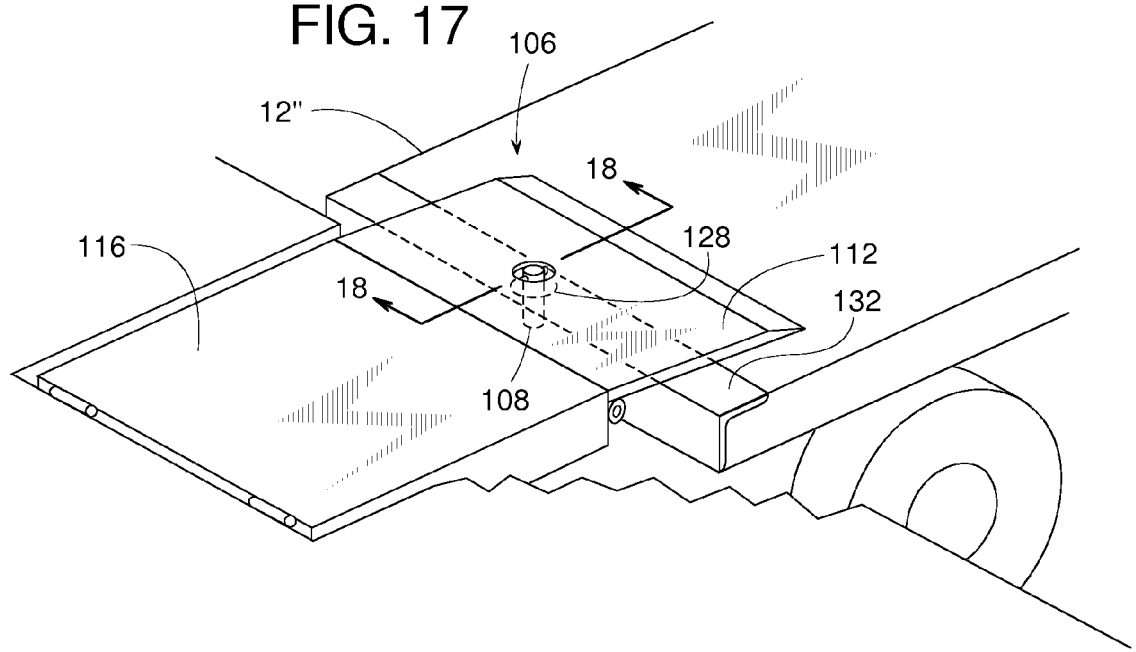
FIG. 17 is a perspective view similar to FIG. 15 but showing the blocking member in a blocking position.
Figure 18:
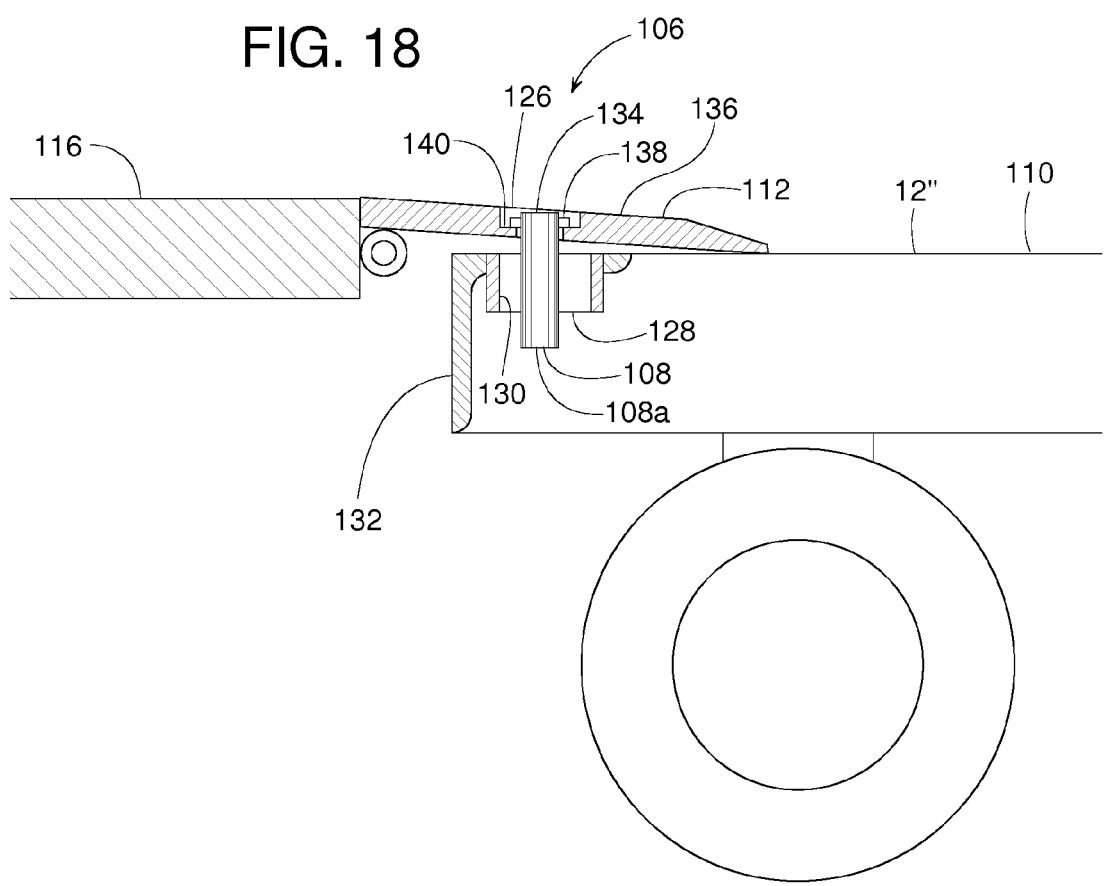
FIG. 18 is a cross-sectional view taken along line 18-18 of FIG. 17.

In this example, to secure vehicle 12" to dock leveler 114, blocking member 108 is in the form of a pin 108a that is manually or otherwise inserted or disposed in a hole 126 in lip 112 to protrude into a restraint feature in the form of a hole 128 in vehicle bed 110, as shown in FIGS. 17 and 18. In this example, a sidewall 130 of hole 128 provides vehicle bed 110 with a horizontal-restraint feature that pin 108a engages to restrain vehicle 12". In some examples, for greater holding strength, hole 128 is in a rear sill 132 or metal frame of vehicle bed 110. In some examples, hole 128 in vehicle bed 110 is appreciably larger in diameter or cross-sectional area than hole 126 in lip 112 to accommodate some radial misalignment between holes 126 and 128.

In some examples, when blocking member 108 is installed in the lip's hole 126, as shown in FIG. 18, an upper edge 134 of blocking member 108 is generally flush with an upper surface 136 of lip 112 so as not to interfere with personnel or material handling traffic moving across lip 112.

In some examples, to prevent blocking member 108 from dropping completely through lip 112, blocking member 108 includes a cross pin 138, D-ring, enlarged head, or some other feature that rests upon a shoulder 140 of hole 126.

In some examples, including vehicle restraints 10, 74, 106 and others, a sensor determines whether the vehicle restraint's blocking member is in the release position or blocking position. Such a sensor provides a feedback signal that controls a light and/or alarm that indicates the blocking member's position. Examples of such a sensor include, but are not limited to, an electromechanical limit switch, proximity switch, photoelectric eye, pressure switch, etc.

Some of the aforementioned examples may include one or more features and/or benefits including, but not limited to, the following:

In some examples, a vehicle restraint in a blocking configuration completely encircles a vehicle's rear impact guard.

In some examples, a vehicle restraint is a combination blocking member and bumper.

In some examples, a vehicle restraint is a combination blocking member and dock leveler lip.

In some examples, a vehicle restraint restrains a vehicle without having to engage the vehicle's wheel or rear impact guard.

In some examples, a vehicle restraint has a low part count, thereby simplifying manufacture and assembly of the vehicle restraint.

In some examples, a vehicle restraint includes few operational steps, making it easy to use.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle restraint to interact with a vehicle having a vehicle bed with a rear vehicle sill and a restraint feature, the vehicle restraint comprising:
   a deck installable at a loading dock;
   a lip extending from the deck, the lip having an upper surface configured to overlap at least a portion of the vehicle bed, the upper surface providing a traffic bearing surface over which at least one personnel or material handling equipment traverse, the deck and lip being movable between a stored configuration and an operative configuration such that the deck and lip in the operative configuration provide a bridge between the vehicle bed and a platform of the loading dock when the vehicle is at the loading dock; and
   a blocking member selectively attachable to the lip to selectively engage and disengage the restraint feature of the vehicle bed, the blocking member positioned through a portion of the upper surface of the lip overlapping the vehicle bed and defining a portion of the traffic bearing surface, the blocking member to restrict forward movement of the vehicle relative to the loading dock and prevent separation of the lip from the vehicle bed when the blocking member is engaged with the restraint feature and the blocking member to allow forward movement of the vehicle relative to the loading dock when the blocking member is disengaged from the restraint.

2. The vehicle restraint of claim 1, wherein the restraint feature is a sidewall of a first hole in the vehicle bed.

3. The vehicle restraint of claim 2, wherein the first hole is in the rear vehicle sill of the vehicle bed.

4. The vehicle restraint of claim 2, wherein the blocking member is a pin extending through a second hole in the lip and protruding downward below the lip into the first hole in the vehicle bed.

5. The vehicle restraint of claim 4, wherein an upper edge of the pin is generally flush with an upper surface of the lip to enable personnel or material handling equipment to traverse over the pin without interference from pin.

6. The vehicle restraint of claim 4, wherein the first hole in the vehicle bed is appreciably larger than the second hole in the lip to accommodate radial misalignment between the first and second holes.

7. A vehicle restraint comprising:
a deck installable at a loading dock, the deck having a front-end portion to bridge a gap between a vehicle bed and a platform of the loading dock when a vehicle is parked at the loading dock; and
a blocking member selectively attachable to the front-end portion of the deck when the front-end portion of the deck is positioned on the vehicle bed, the blocking member to be positioned in a travel path defined by at least the front-end portion of the deck without interfering with at least one of personnel or material handling equipment traversing over the front-end portion, the blocking member to selectively engage a restraint feature of the vehicle bed to restrict forward movement of the vehicle relative to the loading dock and prevent separation of the front-end portion from the vehicle bed, and the blocking member to selectively disengage the restraint feature of the vehicle bed to allow separation of the front-end portion from the vehicle bed and enable forward movement of the vehicle relative to the loading dock.

8. The vehicle restraint of claim 7, wherein the restraint feature comprises a sidewall of a first hole in the vehicle bed.

9. The vehicle restraint of claim 7, wherein the blocking member is a pin extending through a second hole in the front-end portion of the deck and protruding downward below the deck into the first hole in the vehicle bed.

10. The vehicle restraint of claim 9, wherein an upper edge of the pin is generally flush with an upper surface of the front-end portion of the deck.

11. The vehicle restraint of claim 9, wherein the first hole in the vehicle bed is appreciably larger than the second hole in the front-end portion.

12. The vehicle restraint of claim 9, wherein the front-end portion comprises a lip extending from the deck, the deck and lip being movable between a stored configuration and an operative configuration such that the deck and lip in the operative configuration provide the bridge between the vehicle bed and the platform when the vehicle is at the loading dock.

13. A vehicle restraint comprising:
a deck attached to a loading dock, the deck movable between an operative position and a stored position;
a lip movably coupled to the deck and configured to overlap a vehicle bed to bridge a gap between the vehicle bed and a platform of the loading dock when a vehicle is parked at the loading dock, the lip having an aperture positioned through a travel surface of the lip defined by peripheral edges of an upper surface of the lip, the aperture of the lip to align with an opening of the vehicle bed when the lip bridges the gap between the vehicle bed and the platform; and
a pin removably coupled to the aperture of the lip and the opening of the vehicle bed, the pin to couple the lip and the vehicle bed to restrict forward movement of the vehicle relative to the loading dock and prevent separation of the lip from the vehicle bed when the pin is in engagement with the aperture of the lip and the opening of the vehicle bed, the pin to be located in the travel surface of the lip and to not interfere with at least one of personnel or material handling equipment traversing the travel surface of the lip when the pin is coupled to the lip, the pin to allow forward movement of the vehicle relative to the loading dock when the pin is removed from the aperture of the lip and the opening of the vehicle bed.

14. The vehicle restraint of claim 13, wherein an upper edge of the pin is generally flush with an upper surface of the lip.

15. The vehicle restraint of claim 13, wherein the opening in the vehicle bed is appreciably larger than the aperture of the lip to accommodate radial misalignment between the aperture of the lip and the opening of the vehicle bed.

16. The vehicle restraint of claim 13, wherein the pin, aperture of the lip and the opening of the vehicle bed are generally annular shaped to accommodate a slight variation in alignment between the lip and the vehicle bed.

* * * * *